(12) United States Patent
Yang et al.

(10) Patent No.: US 11,412,554 B2
(45) Date of Patent: Aug. 9, 2022

(54) E1 INTERFACE SETUP IN NG-RAN

(71) Applicant: Apple Inc., Cupertino, CA (US)

(72) Inventors: Feng Yang, Beijing (CN); Alexander Sirotkin, Tel-Aviv (IL); Jaemin Han, Hillsboro, OR (US); Xu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 341 days.

(21) Appl. No.: 16/393,753

(22) Filed: Apr. 24, 2019

(65) Prior Publication Data

US 2019/0297652 A1    Sep. 26, 2019

Related U.S. Application Data

(60) Provisional application No. 62/669,780, filed on May 10, 2018.

(51) Int. Cl.
*H04W 76/10* (2018.01)
*H04W 80/04* (2009.01)
*H04W 92/16* (2009.01)

(52) U.S. Cl.
CPC .......... *H04W 76/10* (2018.02); *H04W 80/04* (2013.01); *H04W 92/16* (2013.01)

(58) Field of Classification Search
CPC ...... H04W 76/10; H04W 80/04; H04W 92/16
See application file for complete search history.

(56) References Cited

U.S. PATENT DOCUMENTS

| | | | |
|---|---|---|---|
| 2020/0275498 A1* | 8/2020 | Fiorani | H04W 76/11 |
| 2020/0374946 A1* | 11/2020 | Bedekar | H04W 76/10 |
| 2020/0382240 A1* | 12/2020 | Centonza | H04L 1/08 |
| 2021/0368574 A1* | 11/2021 | Jonsson | H04W 76/00 |

OTHER PUBLICATIONS

Ericsson, AT&T, Vodafone, "Separation of CP and UP", May 15-19, 2017, 3GPP TSG-RAN WG3 #96, Tdoc R3-171725.*
Ericsson, AT&T, Vodafone, "Separation of CP and UP", May 15-19, 2017, TSG-RAN WG3 #96, Tdoc R3-171725 (Year: 2017).*

* cited by examiner

*Primary Examiner* — Luat Phung
(74) *Attorney, Agent, or Firm* — Kowert, Hood, Munyon, Rankin & Goetzel, P.C.

(57) ABSTRACT

Systems and methods of setting up an E1 interface for a gNB are described. A transmitting entity of the gNB-CU-CP and gNB-CU-UP initiates the first TNL association between the gNB-CU-CP and gNB-CU-UP, and is also limited to initiating the E1 Setup procedure. The transmitting entity sends an E1 SETUP REQUEST message to set up the E1 interface. Afterwards, a message is received from the receiving entity. The transmitting entity determines that the setup of the E1 interface is successful if the message contains IEs of an E1 SETUP RESPONSE message. The types of IEs include a message type IE and a name of the transmitting entity.

20 Claims, 6 Drawing Sheets

E1 INTERFACE SETUP IN NG-RAN

This application claims the benefit of priority under 35 U.S.C. 119(e) to U.S. Provisional Patent Application Ser. No. 62/669,780, filed May 10, 2018, which is incorporated herein by reference in its entirety.

TECHNICAL FIELD

Embodiments pertain to radio access networks (RANs). Some embodiments relate to cellular networks, including Third Generation Partnership Project (3GPP) $5^{th}$ generation (5G) New Radio (NR) (or next generation (NG)) networks. Some embodiments relate to setup of the E1 interface.

BACKGROUND

The use of various types of systems has increased due to both an increase in the types of devices user equipment (UEs) using network resources as well as the amount of data and bandwidth being used by various applications, such as video streaming, operating on these UEs. To increase the ability of the network to contend with the explosion in network use and variation, the next generation of communication systems is being created. With the advent of any new technology, the introduction of a complex new communication system engenders a large number of issues to be addressed both in the system itself and in compatibility with previous systems and devices. Such issues arise, for example, in establishing the E1 interface in 5G NodeBs (gNB), which is inefficient.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
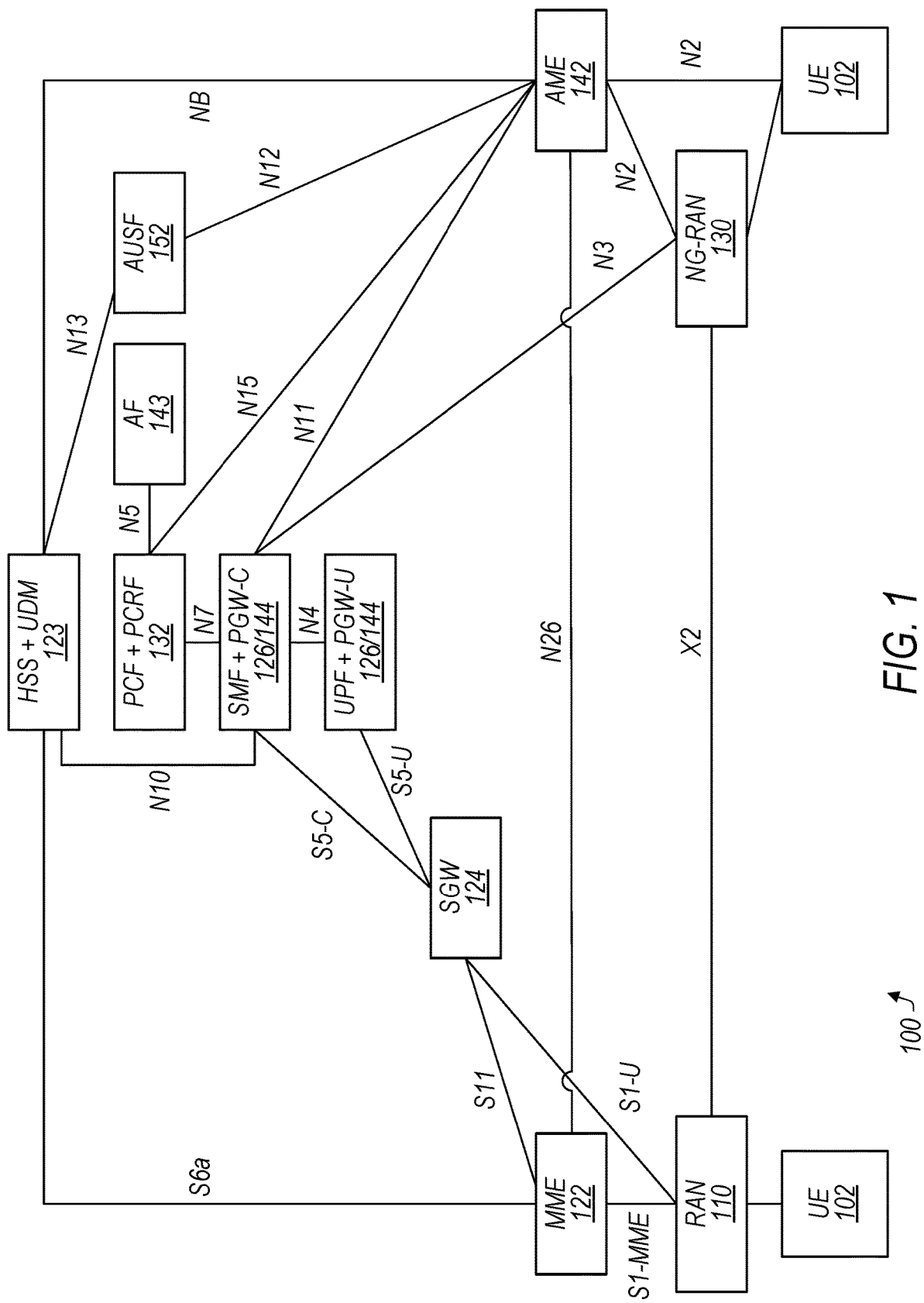
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or random access network (RAN) 110 and/or may be connected to the NG-RAN 130 (gNB) or an Access and Mobility Function (AMF) 142. The RAN may be an eNB, a gNB or a general non-3GPP access point, such as that for Wi-Fi. The NG core network may contain multiple network functions besides the AMF 112. The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
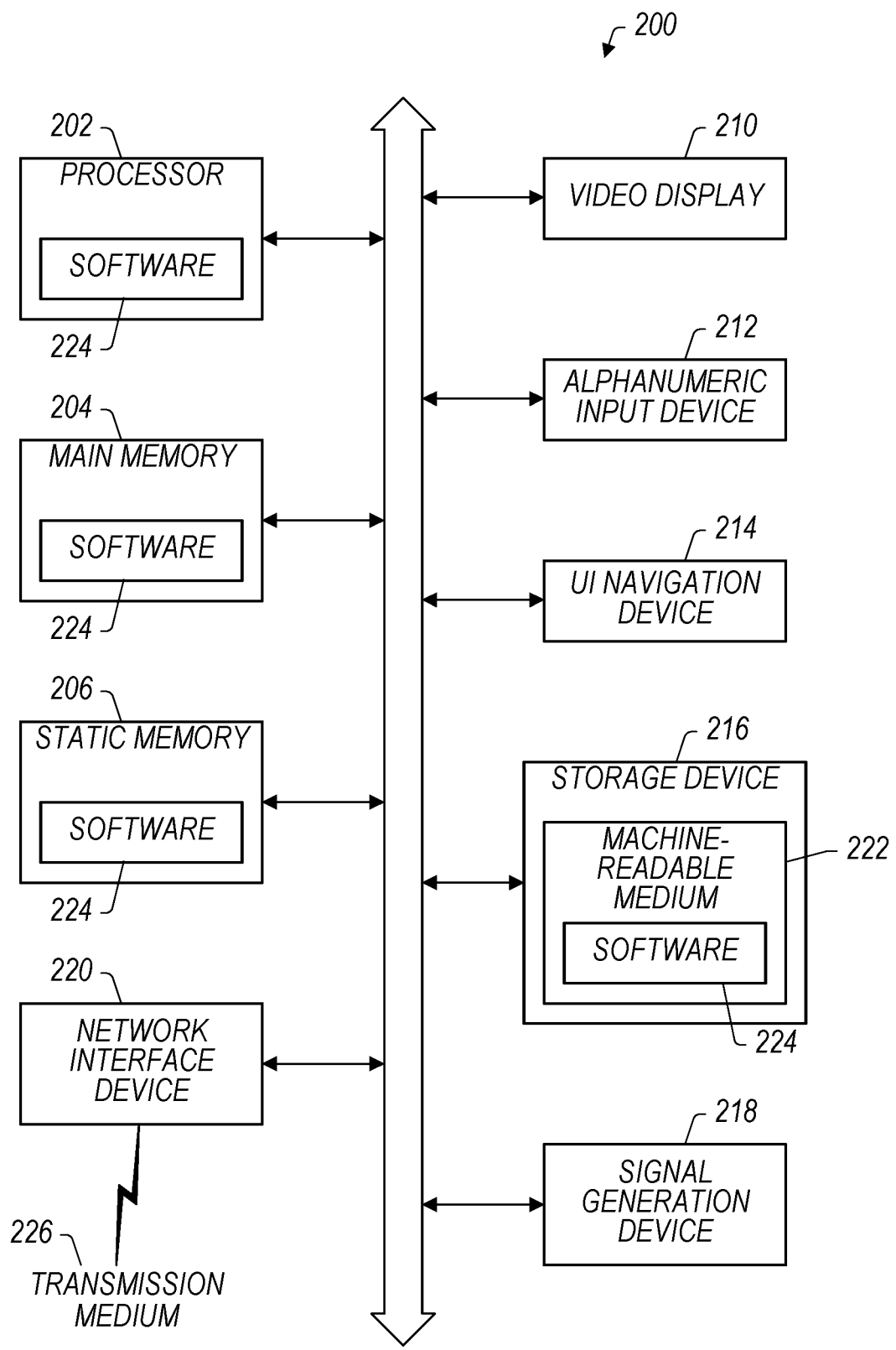
FIG. 2 illustrates a block diagram of a communication device in accordance with some embodiments.

FIG. 2 illustrates a block diagram of a communication device in accordance with some embodiments. In some embodiments, the communication device may be a UE, eNB, gNB or other equipment used in the network environment. For example, the communication device 200 may be a specialized computer, a personal or laptop computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine. In some embodiments, the communication device 200 may be embedded within other, non-communication based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, successfully or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a NG/NR standards among others. In an example, the network interface device 220 may include one or more physical jacks (e.g., Ethernet, coaxial, or phone jacks) or one or more antennas to connect to the transmission medium 226.

Figure 3:
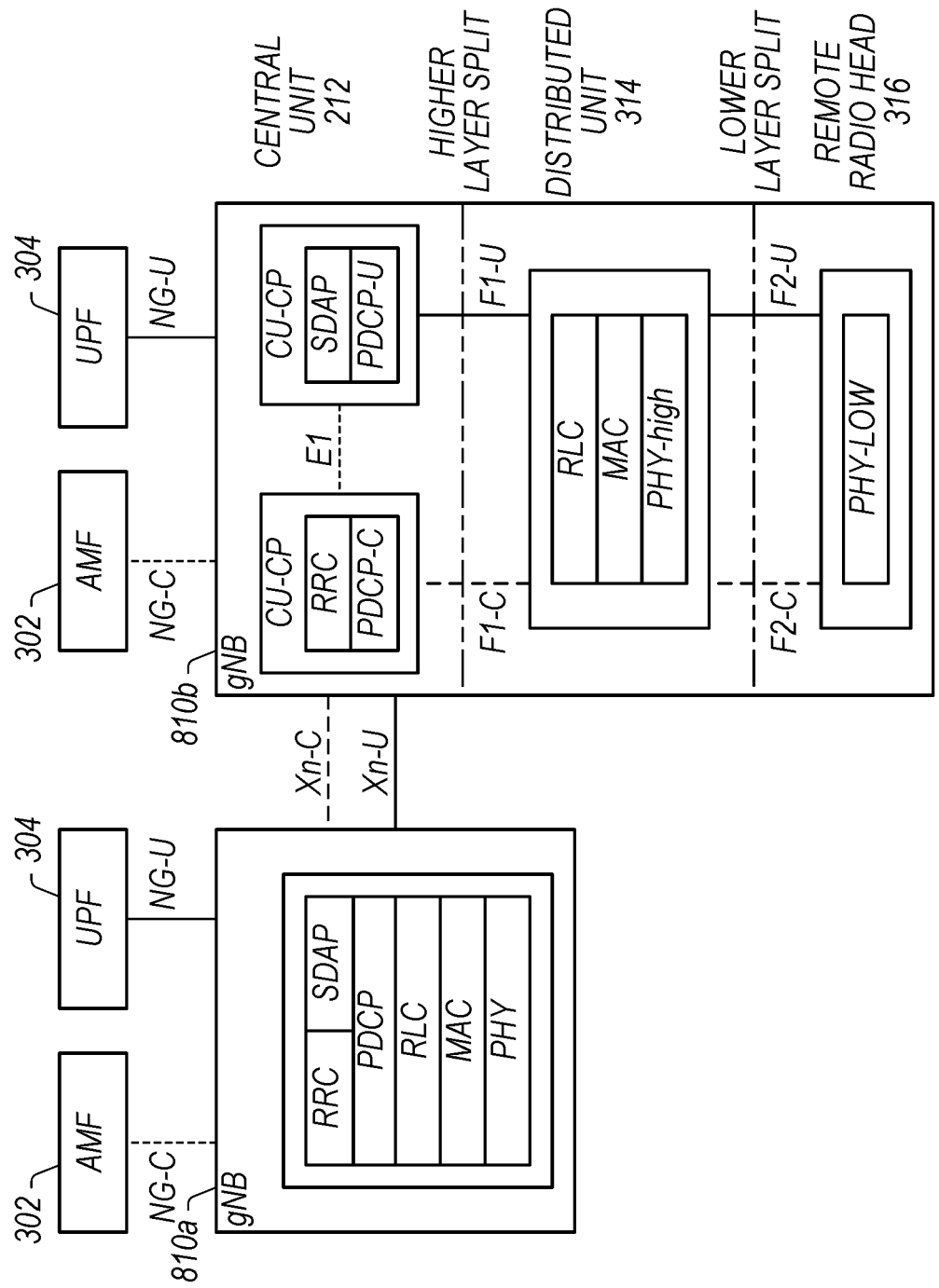
FIG. 3 illustrates interconnections for gNBs in accordance with some embodiments.

One advantage of the NR system is that the UE may be able to take advantage of a dual-connectivity (DC) framework, in which the UE may be connected simultaneously with a master NodeB (MNB) and a secondary NodeB (SNB). The MNB and SNB may be eNBs, gNBs, or a combination thereof, for example. In some embodiments, the MNB may use a single SNB for a bearer associated with the UE. In some embodiments, the MNB may service the UE, so that all UL and DL data flow associated with the bearer is controlled by the MNB. For example, the MNB may transmit packets to the SNB for delivery to the UE. The SNB may provide the MNB with information about packet transmission or delivery to permit the MNB to control packet flow to the SNB to avoid overflow or underflow buffer issues associated with packet delivery to the UE. The packet and control flow may be transmitted over an X2 interface when the MNB and SNB are eNBs over an Xn interface when the MNB and SNB are gNBs (although a combination of eNB and gNB may be used as well). FIG. 3 illustrates interconnections for gNBs in accordance with some embodiments.

As shown in FIG. 3, the gNBs 310a, 310b of the NG-RAN 310 may each be connected with different AMFs 302 and UPFs 304 through an NG-Control plane (NG-C or, as indicated in FIG. 1, N2) interface and an NG-User plane (NG-U or, as indicated in FIG. 1, N3) interface, respectively. In some embodiments, the gNBs 310a, 310b The gNBs 310a, 310b may be connected with each other via dual Xn interfaces for control plane signaling (Xn-C) and user plane signaling (Xn-U). The control plane functions of the Xn-C interface may include interface management and error handling functionality, connected mode mobility management, support of RAN paging and dual connectivity functions, among others. Examples of the interface management and error handling functionality include setup, reset, removal and configuration update of the Xn interface. Examples of connected mode mobility management include handover procedures, sequence number status transfer and UE context retrieval. Examples of dual connectivity functions include secondary node addition, reconfiguration, modification, and release of the secondary node. The user plane functions of the Xn-U interface may include both data forwarding and flow control between the gNBs 310a, 310b.

Each of the gNBs 310a, 310b may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB 310a, 310b may be distributed in different units—a Central Unit (CU) 312, at least one Distributed Unit (DU) 314, and a Remote Radio Head (RRH) 316. The CU 312 may provide functionalities such as the control the transfer of user data, and effect mobility control, radio access network sharing, positioning, and session management, except those functions allocated exclusively to the DU 314.

As shown in FIG. 3, the higher protocol layers (PDCP and RRC for the control plane/PDCP and SDAP for the user plane) may be implemented in the CU 312, and the RLC and MAC layers may be implemented in the DU 314. The PHY layer may be split, with the higher PHY layer also implemented in the DU 314, while the lower PHY layer is implemented in the Remote Radio Head 316. The CU 312, DU 314 and RRH 316 may be implemented by different manufacturers, but may nevertheless be connected by the appropriate interfaces therebetween. The CU 312 may be connected with multiple DUs 314.

The interfaces within the gNB include the E1 and fronthaul (F) F1 interface. As shown, a F2 interface may also be present, but the standards for this interface has not been developed yet. The E1 interface may be between a CU control plane (gNB-CU-CP) and the CU user plane (gNB-CU-UP) and thus may support the exchange of signaling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using a non UE-associated signaling connection and UE-associated services that are related to a single UE and are associated with a UE-associated signaling connection that is maintained for the UE. The E1AP services may include an E1 interface management function, an E1 bearer context management function and allocation of tunnel endpoint identifiers (TEIDs).

The F1 interface may be disposed between the CU 312 and the DU 314. The CU 312 may control the operation of the DU 314 over the F1 interface. As the signaling in the gNB is split into control plane and user plane signaling, the F1 interface may be split into the F1-C interface for control plane signaling and the F1-U interface for user plane signaling, which support control plane and user plane separation. The F1 interface, as above may separate the Radio Network and Transport Network Layers and enable exchange of UE associated information and non-UE associated information.

The F2 interface may be between the lower and upper parts of the NR PHY layer. The F2 interface may also be separated into F2-C and F2-U interfaces based on control plane and user plane functionalities.

Before the various interfaces may be used, the gNB may engage in a setup procedure for each interface. For example, the GNB-CU-UP E1 Setup procedure may exchange application level data used for the gNB-CU-UP and the gNB-CU-CP to correctly interoperate on the E1 interface. The GNB-CU-CP E1 setup procedure similarly may exchange application level data used for the gNB-CU-CP and the gNB-CU-UP to correctly interoperate on the E1 interface. If the gNB-CU-UP or gNB-CU-CP initiates the first Transport Network Layer (TNL) association, the gNB-CU-UP or gNB-CU-CP may also initiate the GNB-CU-UP E1 Setup procedure or the GNB-CU-CP E1 Setup procedure, respectively. The GNB-CU-UP E1 and GNB-CU-CP E1 Setup procedures may use non-UE associated signaling, erase existing application level configuration data in the nodes and replaces the configuration by the configuration received, re-initialize the E1AP UE-related contexts and erase related signaling connections in the nodes.

Thus, both the gNB-CU-CP and gNB-CU-UP may send an E1 SETUP REQUEST after TNL association has become operational. Contention may occur if the gNB-CU-CP and gNB-CU-UP send E1 SETUP REQUEST simultaneously. For example, from the gNB-CU-CP's perspective, a few milliseconds after sending a GNB-CU-CP E1 SETUP REQUEST, the gNB-CU-CP may receive a GNB-CU-UP E1 SETUP REQUEST, rather than the expected GNB-CU-CP E1 SETUP RESPONSE (or GNB-CU-CP E1 SETUP FAILURE). Similarly, from the gNB-CU-UP's perspective, a few milliseconds after sending a GNB-CU-UP E1 SETUP REQUEST, the gNB-CU-UP may receive a GNB-CU-CP E1

SETUP REQUEST, rather than the expected GNB-CU-UP E1 SETUP RESPONSE (or GNB-CU-UP E1 SETUP FAILURE). The four-message procedure is, however, inefficient.

Figure 4A:
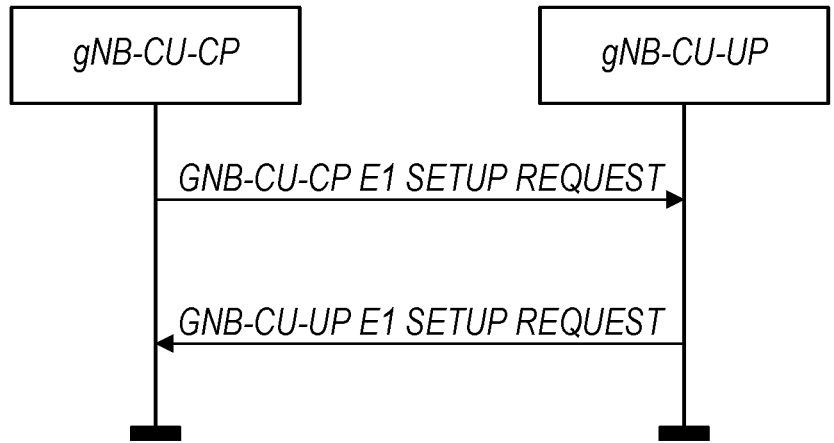
FIGS. 4A and 4B show an E1 setup procedure in accordance with some embodiments.
Figure 4B:
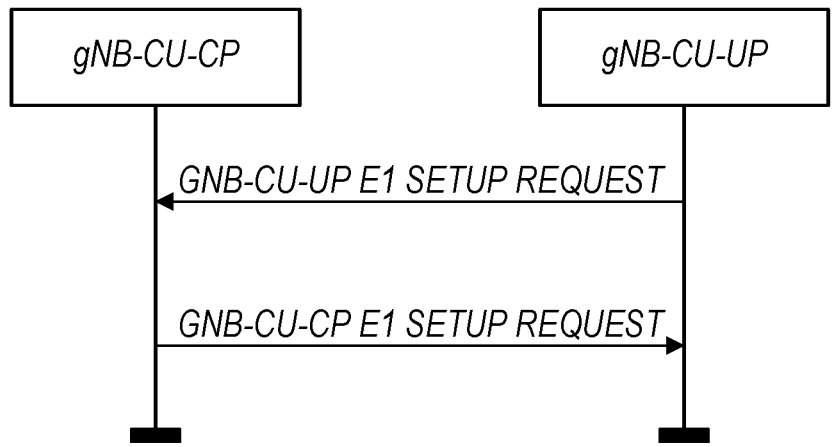

To alleviate this, FIGS. 4A and 4B show an E1 setup procedure in accordance with some embodiments. FIGS. 4A and 4B show a successful E1 setup procedure in which the gNB-CU-CP and the gNB-CU-UP send a GNB-CU-CP E1 SETUP REQUEST and a GNB-CU-UP E1 SETUP REQUEST simultaneously. However, the information elements (IEs) in the GNB-CU-CP E1 SETUP REQUEST and GNB-CU-UP E1 SETUP REQUEST are designed so that the IEs or types of IEs are the same as those in the GNB-CU-UP E1 SETUP RESPONSE and GNB-CU-CP E1 SETUP RESPONSE. Thus, the gNB-CU-CP may take the GNB-CU-UP E1 SETUP REQUEST as the GNB-CU-CP E1 SETUP RESPONSE, and the gNB-CU-UP may take the GNB-CU-CP E1 SETUP REQUEST as the GNB-CU-UP E1 RESPONSE. FIGS. 4A and 4B show simultaneous transmission of the GNB-CU-CP E1 SETUP REQUEST and the GNB-CU-UP E1 SETUP REQUEST in which either the GNB-CU-CP E1 SETUP REQUEST or the GNB-CU-UP E1 SETUP REQUEST is transmitted slightly before the other.

An example of the IEs in the GNB-CU-CP E1 SETUP REQUEST and the GNB-CU-UP E1 SETUP RESPONSE can be as shown in table 1.

TABLE 1

| IE/Group Name | Presence | Assigned Criticality |
| --- | --- | --- |
| Message Type | M | reject |
| gNB-CU-CP ID | M | reject |
| gNB-CU-CP Name | O | ignore |

The Message Type IE may uniquely identify the message being sent. The gNB-CU-CP Name IE may be used as a human readable name of the gNB-CU-CP. An example of the IEs in the GNB-CU-UP E1 SETUP REQUEST and the GNB-CU-CP E1 SETUP RESPONSE can be as shown in table 2.

TABLE 2

| IE/Group Name | Presence | Semantics description | Assigned Criticality |
| --- | --- | --- | --- |
| Message Type | M | | reject |
| gNB-CU-UP ID | M | | reject |
| gNB-CU-UP Name | O | | ignore |
| Supported 5QI | M | | reject |
| Security information | | | |
| NR CGI | M | | reject |
| Broadcast PLMNs | | Broadcast PLMNs | Reject |
| >PLMN Identity | M | | — |
| >Slice Support List | O | Supported S-NSSAIs | — |

In the above embodiment, as in the other embodiments described herein, the request/response used to set up the E1 interface and the information contained therein (IEs) are stored in a memory associated with the gNB.

Figure 5A:
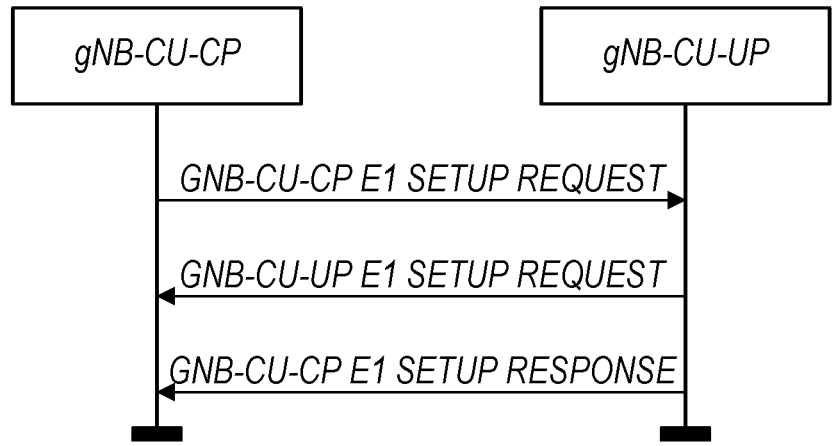
FIGS. 5A and 5B show another E1 setup procedure in accordance with some embodiments.
Figure 5B:
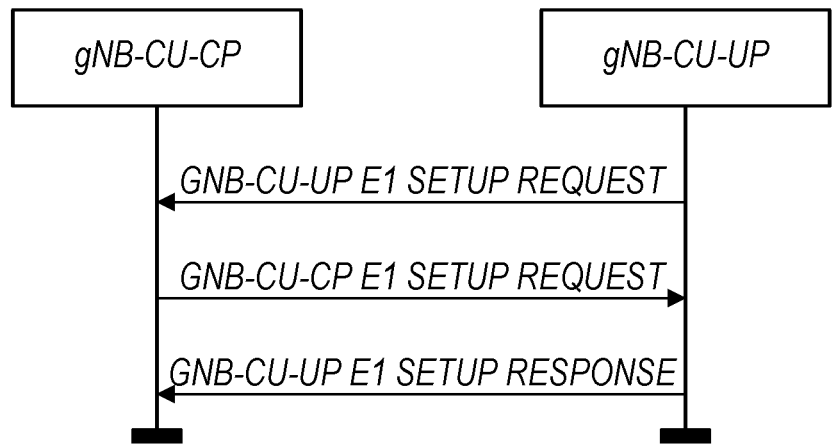

Another embodiment to reduce the inefficiency above is shown in FIGS. 5A and 5B, which show another E1 setup procedure in accordance with some embodiments. In particular, FIGS. 5A and 5B show a successful E1 setup procedure in which the gNB-CU-CP ignores the GNB-CU-UP E1 SETUP REQUEST in case of contention. Instead, after transmission of the GNB-CU-CP E1 SETUP REQUEST, the gNB-CU-CP may wait until a GNB-CU-UP E1 SETUP RESPONSE or FAILURE is received from the gNB-CU-UP. In this case, the gNB-CU-UP may respond with a GNB-CU-CP E1 SETUP RESPONSE even if the gNB-CU-UP has sent a GNB-CU-UP E1 SETUP REQUEST before reception of the GNB-CU-CP E1 SETUP REQUEST when the requests are simultaneously transmitted. FIGS. 5A and 5B show simultaneous transmission of the GNB-CU-CP E1 SETUP REQUEST and the GNB-CU-UP E1 SETUP REQUEST in which either the GNB-CU-CP E1 SETUP REQUEST or the GNB-CU-UP E1 SETUP REQUEST is transmitted slightly before the other.

Figure 6A:
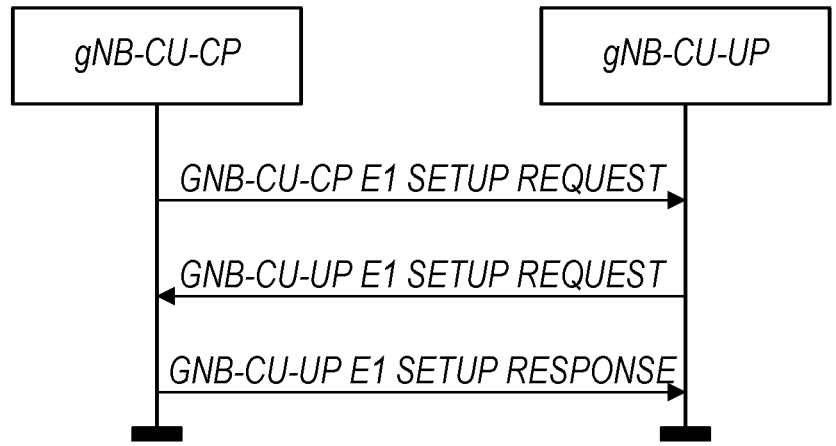
FIGS. 6A and 6B show another E1 setup procedure in accordance with some embodiments.
Figure 6B:
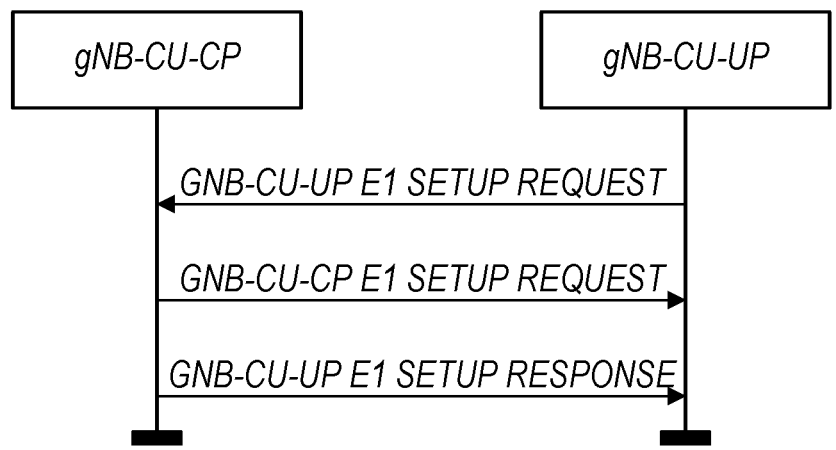

Another embodiment to reduce the inefficiency above is shown in FIGS. 6A and 6B, which show another E1 setup procedure in accordance with some embodiments. In the embodiment shown in FIGS. 6A and 6B, the gNB-CU-UP ignores the GNB-CU-CP E1 SETUP REQUEST in case of contention. Instead, the gNB-CU-UP may wait until a GNB-CU-UP E1 SETUP RESPONSE or FAILURE is received from the gNB-CU-CP. In this case, the gNB-CU-CP may respond with a GNB-CU-UP E1 SETUP RESPONSE even if the gNB-CU-CP has sent a GNB-CU-CP E1 SETUP REQUEST before reception of the GNB-CU-UP E1 SETUP REQUEST when the requests are simultaneously transmitted. FIGS. 6A and 6B show simultaneous transmission of the GNB-CU-CP E1 SETUP REQUEST and the GNB-CU-UP E1 SETUP REQUEST in which either the GNB-CU-CP E1 SETUP REQUEST or the GNB-CU-UP E1 SETUP REQUEST is transmitted slightly before the other.

In another embodiment, E1 SETUP REQUEST and E1 SETUP RESPONSE are designed as in table 3, where only message type and ID is included.

TABLE 3

| IE/Group Name | Presence | Assigned Criticality |
| --- | --- | --- |
| Message Type | M | reject |

In this case, after receiving the E1 SETUP RESPONSE, an E1 CONFIGURATION UPDATE is then sent to provide the information of the gNB-CU-CP or gNB-CU-UP.

In another embodiment, after TNL association has become operational, the gNB-CU-UP may start a gNB-CU-UP timer after a determination by the gNB-CU-UP to send a GNB-CU-UP E1 SETUP REQUEST. The GNB-CU-UP E1 SETUP REQUEST can be sent by the gNB-CU-UP if a GNB-CU-CP E1 SETUP REQUEST has not been received before expiration of the gNB-CU-UP timer. Similarly, in another embodiment, after TNL association has become operational, the gNB-CU-CP may start a gNB-CU-CP timer after a determination by the gNB-CU-CP to send a GNB-CU-CP E1 SETUP REQUEST. The GNB-CU-CP E1 SETUP REQUEST can be sent if GNB-CU-UP E1 SETUP REQUEST has not been received before expiration of the gNB-CU-CP timer. In some embodiments, the gNB-CU-UP timer and the gNB-CU-CP timer may be able to be independently set. The gNB-CU-UP timer and the gNB-CU-CP timer may be symmetric (i.e., be the same time period).

In yet another embodiment, transmission of the E1 SETUP REQUEST may be limited to whichever entity of the gNB-CU-CP and the gNB-CU-UP initiates the Stream Control Transmission Protocol (SCTP) connection procedure (i.e., the first TNL association). The E1 protocol stack may include an application layer signaling protocol (referred to as E1 Application Protocol (E1-AP)) and a transport network layer that is built on SCTP. SCTP is a protocol for transmitting multiple streams of data at the same time between two end points that have established a connection in a network. Like TCP, SCTP manages reliable transport (ensuring the complete arrival of PDUs that are sent over the network) over IP. SCTP may thus be on top of an IP layer, and may provide the guaranteed delivery of application layer messages. Unlike TCP, SCTP may ensure the complete concurrent transmission of several streams of data between connected end points. The multi-streaming allows data to be delivered in multiple, independent streams, so that if there is data loss in one stream, delivery will not be affected for the other streams.

In particular, each SCTP endpoint identifies the SCTP association with a tag. During an SCTP association setup, the SCTP endpoints exchange their own tags for receiving packets. During the exchange of packets between the SCTP endpoints, both the source address and the destination address can change in the association life cycle. SCTP also supports multihoming, which means that a connected end point can have up to 8 alternate IP addresses to route around network failure or changing conditions. Data using SCTP is delivered in chunks within an independent stream, and, as above, the path is selected and monitored to select a primary data transmission path and test the connectivity of the transmission path. Validation and acknowledgment mechanisms provide notification of duplicated or missing data chunks, and error detection is suitable for jumbo Ethernet frames.

The SCTP packet structure includes a common header section of the first 12 bytes of the packet and that includes the source and destination port number, a verification tag checksum, and a data chunk section. The data chunk section contains, for each data chunk: the type (1 byte), flags (8 bits), length (2 bytes) and value of the chunk. The destination port number may be used to route the packet to the appropriate destination or application. The verification tag is a 32-bit random value created during initialization and that distinguishes stale packets from a previous connection. The checksum uses cyclic redundancy check (CRC32) algorithm to detect errors introduced during data transmission. The chunk type identifies the contents of the chunk value field. The chunk flags depend on the chunk type. A default value of zero indicates that no application identifier is specified by the upper layer for the data.

Thus, in some embodiments if the gNB-CU-UP, in response to transmission of the GNB-CU-UP E1 SETUP REQUEST, does not receive the GNB-CU-UP E1 SETUP RESPONSE message or GNB-CU-UP E1 SETUP FAILURE message, the gNB-CU-UP may reinitiate the gNB-CU-UP E1 Setup procedure towards the same gNB-CU-CP. The content of the new GNB-CU-UP E1 SETUP REQUEST message may be identical to the content of the previously unacknowledged GNB-CU-UP E1 SETUP REQUEST message. Similarly, if the gNB-CU-CP, in response to transmission of the GNB-CU-CP E1 SETUP REQUEST, does not receive the GNB-CU-CP E1 SETUP RESPONSE message or GNB-CU-CP E1 SETUP FAILURE message, the gNB-CU-CP may reinitiate the gNB-CU-CP E1 Setup procedure towards the same gNB-CU-UP. The content of the new GNB-CU-CP E1 SETUP REQUEST message may be identical to the content of the previously unacknowledged GNB-CU-CP E1 SETUP REQUEST message.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. A computer-readable non-transitory storage medium that stores instructions for execution by one or more processors of a next generation NodeB (gNB), the one or more processors to configure the gNB to, when the instructions are executed:
    initiate, by one of a central unit control plane (gNB-CU-CP) and a central unit user plane (gNB-CU-UP), a first Transport Network Layer (TNL) association between the gNB-CU-CP and gNB-CU-UP; and
    after the first TNL association is operational, initiate an E1 Setup procedure to set up an E1 interface between the gNB-CU-CP and the gNB-CU-UP,
    wherein initiation of the E1 Setup procedure is performed by the gNB-CU-CP when the gNB-CU-CP initiated the first TNL association, and
    wherein initiation of the E1 Setup procedure is performed by the gNB-CU-UP when the gNB-CU-UP initiated the first TNL association.

2. The medium of claim 1, wherein:
    when initiation of the E1 Setup procedure is performed by the gNB-CU-UP, and
    the E1 Setup procedure is a gNB-CU-UP E1 Setup procedure.

3. The medium of claim I, wherein:
    when initiation of the E1 Setup procedure is performed by the gNB-CU-CP, and
    the E1 Setup procedure is a gNB-CU-CP E1 Setup procedure.

4. The medium of claim 1, wherein the one or more processors further configure the gNB to, when the instructions are executed:
    initiate the E1 Setup procedure by transmission of an E1 SETUP REQUEST message, and
    determine that setup of the E1 interface is successful in response to reception of a message that contains information elements (IEs) of an E1 SETUP RESPONSE message in response to transmission of the E1 SETUP REQUEST message, wherein the E1 SETUP REQUEST message and E1 SETUP RESPONSE message sent by a same entity of the gNB-CU-CP and gNB-CU-UP consist of identical types of the IEs.

5. The medium of claim 4, wherein when initiation of the E1 Setup procedure is performed by the gNB-CU-CP:
   the E1 SETUP REQUEST message is a GNB-CU-CP E1 SETUP REQUEST message, and
   the E1 SETUP RESPONSE message is a GNB-CU-CP E1 SETUP RESPONSE message.

6. The medium of claim 5, wherein:
   the GNB-CU-CP E1 SETUP REQUEST message and the GNB-CU-CP E1 SETUP RESPONSE message comprise a message type IE that identifies the message being sent and a gNB-CU-CP Name IE that indicates a name of the gNB-CU-CP.

7. The medium of claim 4, wherein when initiation of the E1 Setup procedure is performed by the gNB-CU-UP:
   the E1 SETUP REQUEST message is a GNB-CU-UP E1 SETUP REQUEST message, and the E1 SETUP RESPONSE message is a GNB-CU-UP E1 SETUP RESPONSE message.

8. The medium of claim 7, wherein:
   the GNB-CU-UP E1 SETUP REQUEST message and the GNB-CU-UP E1 SETUP RESPONSE message comprise a message type IE that identifies the message being sent, a gNB-CU-UP identity (ID) IE that identifies the gNB-CU-UP, and a gNB-CU-CP Name IE that indicates a name of the gNB-CU-CP.

9. The medium of claim 4, wherein:
   the E1 SETUP REQUEST message and E1 SETUP RESPONSE message from the gNB-CU-CP and gNB-CU-UP comprise setup IEs of a same type, including a message type IE and a name of one of the gNB-CU-CP and gNB-CU-UP that has respectively transmitted the E1 SETUP REQUEST message and E1 SETUP RESPONSE message.

10. The medium of claim 4, Wherein the one or more processors further configure the gNB to, when the instructions are executed:
    if the E1 SETUP RESPONSE message in response to transmission of the E1 SETUP REQUEST message has not been received, wait a predetermined amount of time after transmission of the E1 SETUP REQUEST message before re-transmission of the E1 SETUP REQUEST message.

11. An apparatus of a next generation NodeB (gNB), the apparatus corn prising:
    processing circuitry; and memory,
    wherein the gNB is configured with logical nodes including a gNB central unit (gNB-CU) and a gNB distributed unit (gNB-DU), the gNB-CU comprising a gNB-CU control plane (gNB-CU-CP) for control-plane functionality and a gNB-CU user plane (gNB-CU-UP) for user-plane functionality, the gNB-CU-CP configured to communicate with the gNB-CU-UP over an E1 interface, the gNB-CU-UP configured to communicate user plane messages with the gNB-DU over an F1 user-plane interface (F1-U), the gNB-CU-CP is configured to communicate control plane messages with the gNB-DU over an F1 control plane interface (F1-C), the processing circuitry configured to:
    initiate, by one of the gNB-CU-CP and gNB-CU-UP, a first Transport Network Layer (TNL) association between the gNB-CU-CP and gNB-CU-UP; and
    after the first TNL association is operational, initiate an E1 Setup procedure to set up the E1 interface between the gNB-CU-CP and the gNB-CU-UP, wherein initiation of the E1 Setup procedure is performed by the gNB-CU-CP when the gNB-CU-CP initiated the first TNL association, and wherein initiation of the E1 Setup procedure is performed by the gNB-CU-UP when the gNB-CU-UP initiated the first TNL association; and
    a memory configured to store information of the E1 Setup procedure.

12. The apparatus of claim 11, wherein:
    when initiation of the E1 Setup procedure is performed by the gNB-CU-UP, the E1 Setup procedure is a gNB-CU-UP E1 Setup procedure.

13. The apparatus of claim 11, wherein:
    when initiation of the E1 Setup procedure is performed by the gNB-CU-CP the E1 Setup procedure is a gNB-CU-CP E1 Setup procedure.

14. The apparatus of claim 11, wherein the one or more processors further configure the gNB to, when the instructions are executed:
    initiate the E1 Setup procedure by transmission of an E1 SETUP REQUEST message, and
    determine that setup of the E1 interface is successful in response to reception of a message that contains information elements (IEs) of an E1 SETUP RESPONSE message in response to transmission of the E1 SETUP REQUEST message, wherein the E1 SETUP REQUEST message and E1 SETUP RESPONSE message sent by a same entity of the gNB-CU-CP and gNB-CU-UP consist of identical types of the IEs.

15. The apparatus of claim 14, wherein when initiation of the E1 Setup procedure is performed by the gNB-CU-CP:
    the E1 SETUP REQUEST message is a GNB-CU-CP E1 SETUP REQUEST message,
    the E1 SETUP RESPONSE message is a GNB-CU-CP E1 SETUP RESPONSE message, and
    the GNB-CU-CP E1 SETUP REQUEST message and the GNB-CU-CP E1 SETUP RESPONSE message comprise a message type IE that identifies the message being sent and a gNB-CU-CP Name IE that indicates a name of the gNB-CU-CP.

16. The apparatus of claim 14, wherein when initiation of the E1 Setup procedure is performed by the gNB-CU-uP:
    the E1 SETUP REQUEST message is a GNB-CU-UP E1 SETUP REQUEST message,
    the E1 SETUP RESPONSE message is a GNB-CU-UP E1 SETUP RESPONSE message, and
    the GNB-CU-UP E1 SETUP REQUEST message and the GNB-CU-UP E1 SETUP RESPONSE message comprise a message type IE that identifies the message being sent, a gNB-CU-UP identity (ID) IE that identifies the gNB-CU-UP, and a gNB-CU-CP Name IE that indicates a name of the gNB-CU-CP.

17. The apparatus of claim 14, Wherein:
    the E1 SETUP REQUEST message and E1 SETUP RESPONSE message from the gNB-CU-CP and gNB-CU-UP comprise setup IEs of a same type, including a message type IE and a name of one of the gNB-CU-CP and gNB-CU-UP that has respectively transmitted the E1 SETUP REQUEST message and E1 SETUP RESPONSE message.

18. The apparatus of claim 14 wherein the processing circuitry is further configured to:
    if the E1 SETUP RESPONSE message in response to transmission of the E1 SETUP REQUEST message has not been received, wait a predetermined amount of time after transmission of the E1 SETUP REQUEST message before re-transmission of the E1 SETUP REQUEST message.

19. An apparatus of a central unit user plane of a next generation NodeB (gNB-CU-UP), the apparatus comprising:
processing circuitry configured to:
initiate a first Transport Network Layer (TNL) association between the gNB-CU-UP and a central unit control plane (gNB-CU-CP)); and
after the first TNL association is operational, initiate an E1 Setup procedure to set up an E1 interface between the gNB-CU-CP and gNB-CU-UP,
wherein establishment of the E1 interface is limited to the gNB-CU-UP and comprises:
transmission of a gNB-CU-UP E1 SETUP REQUEST message, and
determination that setup of the E1 interface is successful in response to reception of a message that contains information elements (IEs) of a gNB-CU-UP E1 SETUP RESPONSE message in response to transmission of the gNB-CU-UP E1 SETUP REQUEST message; and
a memory configured to store the IE of the gNB-CU-UP E1 SETUP REQUEST message.

20. The apparatus of claim 19, wherein:
the gNB-CU-UP E1 SETUP RESPONSE message and a GNB-CU-UP E1 SETUP REQUEST message consist of identical types of the IEs.

* * * * *

UNITED STATES PATENT AND TRADEMARK OFFICE
CERTIFICATE OF CORRECTION

| | |
|---|---|
| PATENT NO. | : 11,412,554 B2 |
| APPLICATION NO. | : 16/393753 |
| DATED | : August 9, 2022 |
| INVENTOR(S) | : Feng Yang et al. |

It is certified that error appears in the above-identified patent and that said Letters Patent is hereby corrected as shown below:

In the Claims

Column 11, Line 37, delete "Wherein" and substitute --wherein--.

Column 11, Line 47, delete "corn prising" and substitute --comprising--.

Column 12, Line 55, delete "Wherein" and substitute --wherein--.

Column 13, Line 24, delete "the IE" and substitute --the IEs--.

Signed and Sealed this
Twenty-fourth Day of October, 2023

Katherine Kelly Vidal
*Director of the United States Patent and Trademark Office*